United States Patent [19]

Anderson

[11] 4,023,059

[45] May 10, 1977

[54] HIGH PRESSURE LIGHT EMITTING ELECTRIC DISCHARGE DEVICE

[76] Inventor: Scott Anderson, 1116 W. Church St., Champaign, Ill. 61820

[22] Filed: Apr. 23, 1975

[21] Appl. No.: 570,778

Related U.S. Application Data

[62] Division of Ser. No. 259,858, June 5, 1972, Pat. No. 3,948,793.

[52] U.S. Cl. .............................. 313/184; 313/229
[51] Int. Cl.$^2$ ....................................... H01J 61/18
[58] Field of Search .......................... 313/229, 184

[56] References Cited

UNITED STATES PATENTS

| | | |
|---|---|---|
| 3,234,421 | 2/1966 | Reiling ........................... 313/229 X |
| 3,279,877 | 10/1966 | Smith et al. .................. 313/229 X |
| 3,334,261 | 8/1967 | Butler et al. .................. 313/229 |
| 3,351,798 | 11/1967 | Bauer ........................... 313/229 X |
| 3,407,327 | 10/1968 | Koury et al. .................. 313/229 |
| 3,445,719 | 5/1969 | Thouret et al. .............. 313/229 X |
| 3,514,659 | 5/1970 | Gungle et al. ................. 313/229 X |
| 3,558,963 | 1/1971 | Hanneman et al. ........... 313/229 X |

OTHER PUBLICATIONS

"High-Wattage High Density Line Spectra Metal Halide Lamp," by F. Koury et al., *J. Illum. Eng. Soc.* (USA), vol. 1, No. 3, pp. 216–221, Apr. 1972.

*Primary Examiner*—Palmer C. Demeo
*Attorney, Agent, or Firm*—Burns, Doane, Swecker & Mathis

[57] ABSTRACT

Compositions are described including free-flowing particles of controlled size of purified metal halides such as sodium iodide and mixtures of sodium iodide with scandium iodide. These ultra-pure metal halide particles are particularly useful as a vaporizable fill disposed within an arc tube of a high pressure electric discharge device. The preparation and identification of the coordination entity Na$^+$ScI$_4^-$(III) is also described. The apparatus for producing purified metal halides of accurately controlled particle size includes means for evaporating volatiles from the solid impure metal halide, melting the impure halide, passing hydrogen, hydrogen halide, hydrogen and halogen, or mixtures thereof through the halide, and then passing the molten halide through a vibrating discharge conduit or nozzle into an inert quenching atmosphere to form the particles of purified halide.

16 Claims, 4 Drawing Figures

HIGH PRESSURE LIGHT EMITTING ELECTRIC DISCHARGE DEVICE

This is a division, of application Ser. No. 259,858, filed June 5, 1972, now U.S. Pat. No. 3,848,793.

BACKGROUND OF THE INVENTION

In recent years, there has been increasing interest in metal halide lamps, i.e., electric discharge devices which emit color-modified light and contain various metal halides as additives. The useful life of these lamps may range from 6,000 to over 10,000 hours, and the efficiency, measured in lumens of light per watt, of metal halide lamps in many instances is greater than 100.

In the preparation of these lamps, additive metal halides have been pulverized or powdered, and then pelleted in a desired mass or weight for machine feeding to the arc tube or envelope of the lamp. These metal halides, however, have contained impurities such as water and various hydroxides. Flaming, i.e., heating with a hand torch, has been used to drive off the water, but this procedure does not normally remove the hydroxide impurities, and has a further disadvantage in that other volatile material, desirably left in the lamp, is also driven off with the water.

The presence of hydrogen and oxygen in any form within the lamp envelope is detrimental to the lamp. These detriments may exist not only as free hydrogen and oxygen, but also as compounds thereof such as water, hydroxides, sulfates and silicates. The oxygen present within the envelope of the lamp oxidizes the metals such as tungsten which make up the lamp electrodes or filaments, and the resulting metal oxide condenses upon the interior surface of the lamp envelope thereby reducing lamp efficiency. The hydrogen present within the envelope of the lamp then reduces the oxide back to the metal freeing the oxygen to further corrode and remove more of the metal from the filament or electrode and further clouding the envelope by depositing the metal on the interior surface thereof. Thus, the lamp envelope becomes increasingly cloudy with a corresponding reduction in the efficiency of the lamp, and the metal filaments are deteriorated reducing the useful life of the lamps.

Accordingly, a primary object of the present invention is to provide an electric lamp having a fill of ultra-pure metal halide of controlled size.

Other objects and advantages of the present invention will become apparent from the following.

In accordance with one aspect of the present invention, purified metal halides are provided as a vaporizable fill disposed within an arc tube of a high pressure electric discharge device.

Other aspects and advantages of the present invention will be readily apparent to one skilled in the art to which the invention pertains from the claims and following more detailed description of a preferred embodiment when read in conjunction with the appended drawings.

DESCRIPTION OF THE PREFERRED EMBODIMENT

Figure 1:
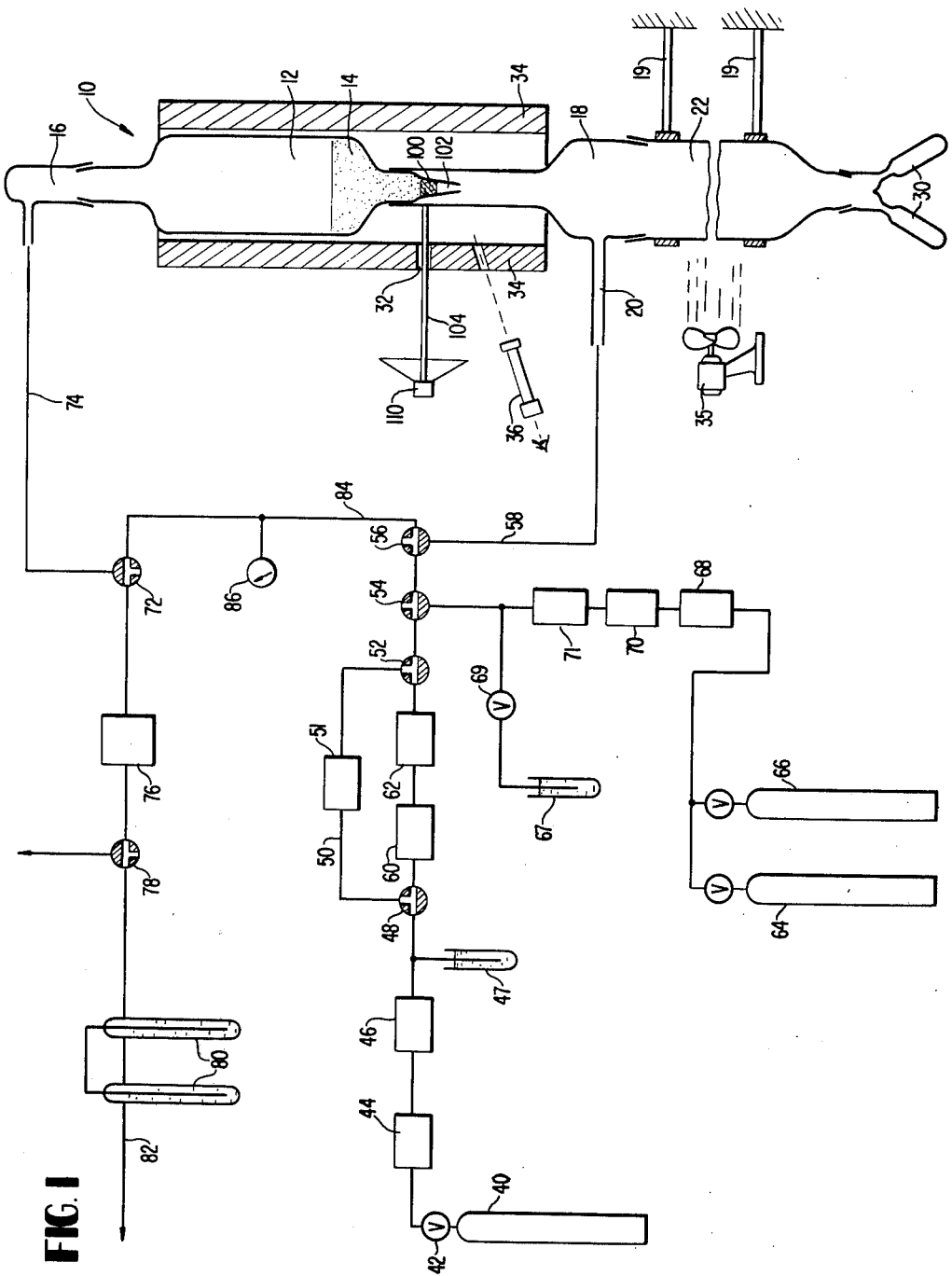
FIG. 1 is a schematic representation of the novel apparatus for producing discrete particles of purified metal halide.

Referring to FIG. 1, a purification vessel 10 has an upper section 12 for holding the metal halide 14 with an outlet 16 at the uppermost end thereof for the egress of various gases therefrom, and means 32 for vibrating the lower end thereof. The upper section 12 of the vessel means 10 is hermetically sealed in axial relationship with a lower section 18 which comprises a gas inlet 20, a condensing chamber 22, and one or more collection vials 30. A conventional furnace 34 is shown schematically as the means for raising the temperature of the salt 14 above its melting point and for keeping it molten as it passes from the upper section 12 into the lower section 18 of the purification vessel 10. Brackets 19 may be affixed to the lower section 18 of the vessel 10 to hold the vessel 10 in an upright or vertical position. A fan 35 or other cooling means may be used to keep the condensing chamber 22 at a temperature below the melting point of the salt 14, so that the particles 120 may be quenched or solidified during their fall through the chamber 22 into the collection vials 30.

A cathetometer 36 or the like may be used to observe the molten halide to ensure that the molten halide is passing properly from the upper section 12 to the lower section 18 of the vessel 10.

Auxiliary apparatus includes a tank 40 containing hydrogen and a fluid passage comprising a valve 42, a reducing zone 44, a desiccant 46, a mercury column release valve 47, and a valve 48. From that point, the hydrogen may be saturated with halogen gas and passed directly into the lower section 18 of the purification vessel 10 by means of a conduit 50, a bed 51 of halogen, e.g., iodine, crystals, valves 52, 54 and 56, a conduit 58 and the inlet 20. Alternately, the hydrogen may be passed through a bed 60 of halogen, e.g., iodine, crystals and a reaction zone 62 with corresponding admission of the resulting reaction products to the purification vessel 10.

Inert gases such as argon and helium may be provided in tanks 64 and 66, respectively, and may be passed through a bed 68 of charcoal to absorb any hydrocarbon impurities, a desiccant 70, a bed 71 of reducing agent, e.g., titanium sponge at 850° C, to remove any remaining water and oxygen, and then through the valves 54 and 56 and the conduits 58 and 20 into the lower section 18 of the purification vessel 10.

The outlet 16 of the upper section 12 may be connected to a valve 72 through a line 74. A mercury column release valve 67 and valve 69 may be used to control pressure in the conduit between the tanks 64 and 66 and valve 54. The valve 72 may be connected to a cold finger or trap 76 to condense water vapor and other condensable vapors, and the gas may then be passed through a valve 78 into bubblers 80 and then exhausted through a line 82. The valve 56 and the line 84 may be provided in fluid communication with the valve 72 such that inert gases from the tanks 64 and 66 may be passed through the line 74 and the conduit 16 into the upper section 12 of the purification vessel 10 to provide a positive pressure on the upper surface of the molten salt 14. A conventional pressure gauge 86 may be provided to monitor the pressure in the line 84.

The upper section 12 of the purification vessel 10 may have in its lower portion in a silica frit filter 100 disposed immediately above a funnel or nozzle 102. The vibrating means 32 may comprise a quartz rod 104 adjacent and disposed between an electromechanical transducer 110 and the lower section 18 of the vessel 10.

In operation, a reagent grade metal halide 14 may be placed in the upper section 12 of the vessel 10 atop the silica frit filter 100 and the halide then outgassed to remove as much volatiles, e.g., free water, as possible. The outgassing, if necessary because of volatile impurities trapped with the halide, may be conducted at temperatures from above about 50° C to about the melting point of the halide, preferably from about 100° C to 120° C, and at atmospheric, superatmospheric or subatmospheric pressure, advantageously subatmospheric pressures of about $10^{-2}$Torr (mm Hg) to $10^{-6}$Torr, for a suitable time, e.g., about 16 to 48 hours, with the volatile gases being vented from the vessel 10 through the outlets 16 and 20.

Following the outgassing, hydrogen gas from the tank 40 may be flowed through a reducing zone 44 to remove any oxygen impurity therein. For example, the reducing zone 44 may comprise copper turnings maintained at a temperature of about 600° to 800° C, and preferably 650° to 700° C. The hydrogen gas may then be dried by passing it over a desiccant 46 such as magnesium perchlorate. The purified hydrogen gas may then be passed over a bed or zone of halogen 60 to charge or infuse the hydrogen with halogen of the same halogen species or molecular weight as the halogen radical of the metal halide to be purified. For example, if sodium iodide is being purified, the hydrogen would be infused with iodine.

For example, the hydrogen may be charged with about 0.01 to 99.9 volume percent, preferably 1 to 50 volume percent, and most preferably about 20 to 30 volume percent iodine. For example, the hydrogen may be passed over or infused with iodine at a temperature between about 25° and 200° C, and preferably about 135° to 190° C.

In one embodiment, the mixture of hydrogen and halogen may then be passed directly to the purification vessel 10. Advantageously, the mixture may first be passed through a reaction zone to produce a hydrogen halide reaction product. For example, a mixture of hydrogen and iodine may be passed over a platinum catalyst at temperatures between 350° and 450° C, and preferably between 390° and 400° C, to form a resulting reaction mixture containing hydrogen iodide which may be present in a volume percent of from about 0.01 to 99.9, preferably about 1 to about 50 percent and most preferably about 20 to 30 percent.

If desired, hydrogen halides such as hydrogen iodide may be obtained directly from storage tanks or the like for use in the present invention instead of the above described reaction method.

The hydrogen and halogen or hydrogen halide gas mixture may then be passed through the halide or salt 14 by way of conduits 58 and 20 into the lower section 18 of purification vessel 10 with suficient pressure below the filter 100 to force the gas mixture up through the nozzle 102, through the salt 14, and then out of the upper section 12 of the purification vessel 10 through the outlet 16.

While the gas mixture is flowing through the salt 14, the temperature of the salt may be raised above the melting point, and preferably to 25° C to 50° C above the melting point of the salt, if the liquid temperature range of the salt will permit. During melting, the gas mixture removes any water by a scrubbing or stripping action, converts any hydroxides to the corresponding halides and water, and converts any sulfates to the corresponding halides, water and hydrogen sulfide. For example, when purifying reagent grade sodium iodide, the final oxygen content of the purified sodium iodide may be on the order of 20 to 5 parts per million, and advantageously is about 1 to 5 parts per million.

The molten salt may contain some dissolved water and dissolved gases which it is desirable to remove. The dissolved water and gases may be removed by evacuation of the molten salt to subatmospheric pressures, e.g., about $10^{-1}$ to $10^{-2}$Torr, and then scrubbing the molten salt with an inert gas such as argon, nitrogen, or helium. For example, 3 to 20 evacuations with subsequent scrubbing, first with argon to remove hydrogen halide and other gases, and then with helium to remove hydrogen and other gases may be sufficient to remove substantially all of the dissolved gases in the molten salt. The evacuations may be accomplished by applying a partial differential vaccum to keep the molten salt on top of the silica frit, to the outlet 16 and the inlet 20 of the purification vessel 10, with scrubbing being accomplished by feeding the inert gases in through the inlet 20 and out through the outlet 16.

Following the above purification steps, the salt may be filtered and formed into precisely sized particles.

Customarily, reagent grade halides are prepared in carbonaceous solvents, and because of this, free carbon may be present in the salt. Further, there may be other impurities and insoluble oxide-containing particles and thus a suitable filter such as a silica frit filter 100 may thus be provided in the funnel or nozzle 102 for removing these impurities.

Thereupon, an inert gas such as helium may be put into the condenser section 22 and into the upper section 12 above the molten salt 14 so that the salt is forced downwardly through the nozzle 102 as a jet, i.e., as a continuous stream and not dropwise. The salt 14 may then be disturbed sufficiently in a controlled manner as it flows through the nozzle 102 to break up into small particles of predetermined size.

Figure 2:
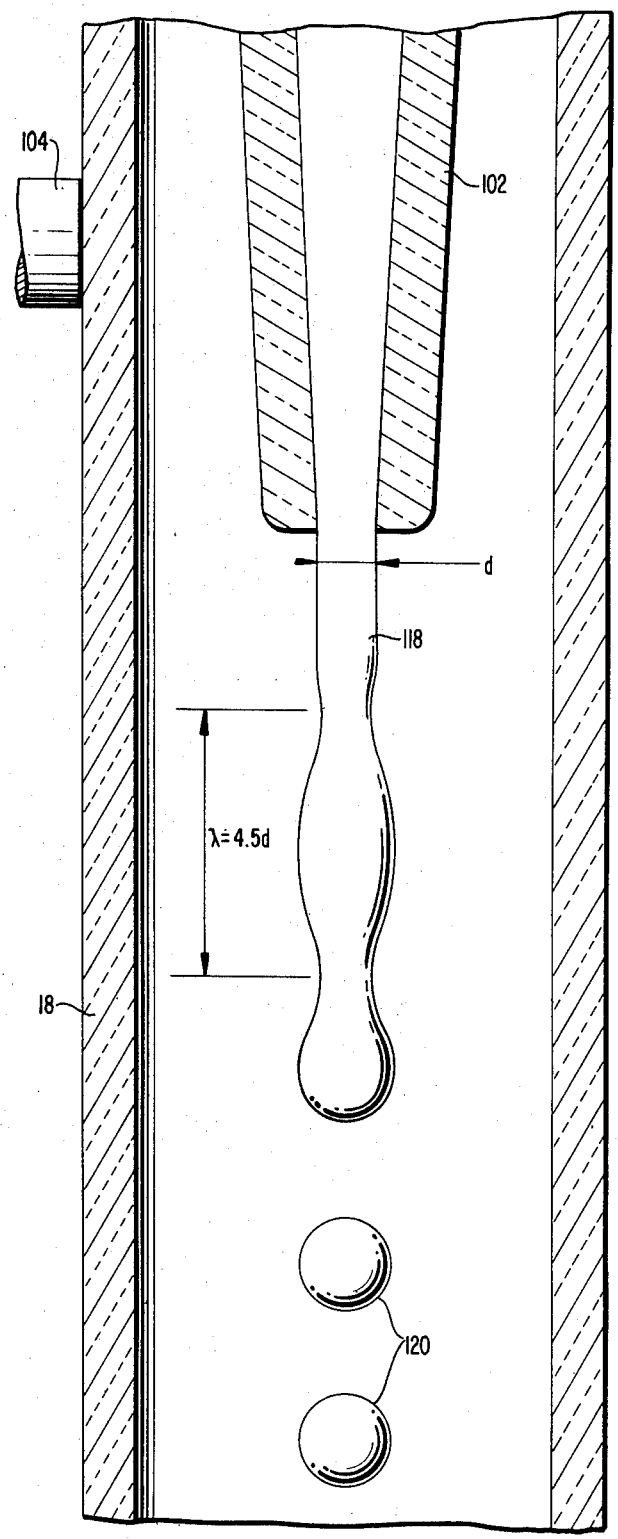
FIG. 2 shows diagrammatically the separation into individual particles of a vibrated stream of molten halide.

Referring to FIGS. 1 and 2, the rod 104 causes the nozzle 102 to transmit vibrations to the molten salt 14 as it passes through the nozzle 102 and to thus separate into discrete particles 120 of regular size. Surface tension draws the molten salt into substantially spherical form and the droplets solidify as they fall through the condensing section 22 of the purification vessel 10. The particles may be collected in vials 30 and are removed therefrom in a suitable and conventional manner without exposure to a contaminating atmosphere.

The frequency of the vibrations and the velocity of the stream 118 issuing from the nozzle 102 causes predictable separation of the continuous stream 118 into the individual particles 120. The velocity V of the wave in the stream 118 induced by the vibrations is, to all practical purposes, the same as the velocity of the stream and is equal to the frequency f times the wave length $\lambda$ as with any other wave, $$V = f\lambda \qquad (1)$$

In a freely flowing stream with no exterior impressed disturbance, the wave length corresponding to the natural resonant frequency of the system is most likely to disintegrate the stream into particles and has been found to be about 4.5 times the diameter d of the nozzle through which the jet or stream 118 is passed.

The induced vibrations thus effectively cut up the stream 118 into equal lengths and consequently equal masses at a constant velocity. So that when the stream is eventually broken up into particles, the particles each have a mass equal to $$(\pi d^2 \rho \lambda)/4 \qquad (2)$$

where $d/2$ is the jet stream nozzle radius, $\rho$ is the density, and $\lambda$ is the wave length of the vibrations which from equation (1) is equal to the velocity divided by the frequency, $\lambda = V/f$.

Although the highest yield of uniform particles is normally obtained when the parameters are adjusted so that the wave length $\lambda$ is equal to about 4.5 times the diameter d of the nozzle, the system will generally resonate to the impressed frequency, thereby providing a choice of wave lengths $\lambda$ and particle sizes.

For example, if liquid droplets are desired which will be approximately 200 microns in diameter, the nozzle diameter is 50 mirons, ¼ of the diameter of the particle desired, the parameters are adjusted such that the wave length $\lambda$ is equal to 4.5 times the diameter $d$. However, if a larger particle size is desired, the velocity can be increased and/or the frequency of the vibrations decreased to where the system will resonate to the new set of conditions.

In another exemplary situation where the diameter of a given solid particle size is desired, say between 250 and 200 microns, the size of the liquid droplets is first calculated. Since the ratio of the solid density, $\rho s$, to the liquid density, $\rho 1$ is equal to about 1.333, $$(\rho s/\rho 1) = 1.333 \qquad (3)$$

then a solid particle of 225 microns diameter will be formed from a liquid droplet of about 300 microns diameter. Therefore, since the diameter of the liquid droplets may range from about 2 to 6, and more normally 3 to 5, times the diameter of the nozzle, the nozzle should have a diameter of about 300/4, or about 75 microns.

The frequency of vibration, $f$, may be varied, for example, from about 1 to about 25,000 Hertz, and preferably about 500 to 10,000 Hertz. Obviously, the frequency governs the separation between adjacent vibratory nodes and hence the volume of material in a given particle. Thus, with a constant nozzle diameter and a constant pressure differential across the salt 14, the lower the frequency within the range of allowable frequencies, the longer the intervals and the larger the particles will be.

When the frequency introduced is much below that tending to produce a condition of resonance or maximum instability of the column, an unstable condition of separation may exist in which one or more fine particles may merge with a major particle to produce an oversized particle. Above the optimum frequency the range of permissible variation is much greater. In fact, it may often be desirable to employ a higher frequency than the calculated optimum, for within a very short distance of the condenser 22 the stream velocity may be much greater than that upon which the calculations were based and the stream diameter may be materially less.

A value of frequency may vary within the operative limits for any particular nozzle orifice and pressure or hydrostatic head, although it should be noted that departures from optimum should generally be in the direction of a high frequency. since the factors of hydrostatic head and frequency are readily controllable, experimental runs, particularly with the aid of a stroboscopically flashing lamp synchronized with the frequency applied, will serve to determine the operative limits.

The exact method of applying the vibratory impulse to the stream, and the axis of the applied vibratory impulse, do not appear to be particularly critical as long as a vibration is induced in the flowing stream in which the frequency of maximum instability or resonance is prominent.

With reference again to FIG. 1, the condenser 22 should be of sufficient length, e.g., 6 inches to 6 feet, such that the liquid droplets will have time to solidify during their fall. Further, the condenser may be filled with an inert gas, preferably helium because of its desirable quenching characteristics, so as not to contaminate the purified particles. To aid in the quenching process, the inert gas may be at a temperature substantially lower than the melting point of the halide, e.g., the wall temperature of the quenching chamber may be about 0° C to 50° C.

Figure 3:
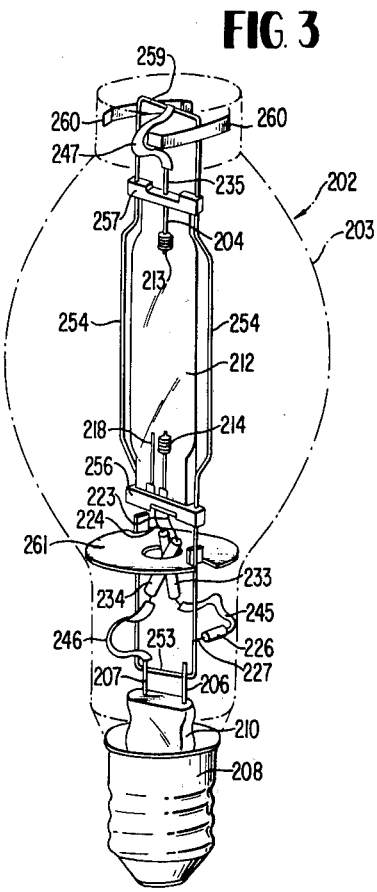
FIG. 3 is a pictorial view of a high pressure electric discharge device.

Referring now to FIG. 3, a high presure electric discharge device is shown in which device the ultra-pure metal halide particles of the present invention may be added. For clarity of presentation, the outer bulbous envelope and the base of the lamp are shown n phantom lines surrounding the arc tube harness and the arc tube. The device, as shown in the drawing, comprises an outer vitreous envelope or jacket 202 of generally tubular form having a central bulbous portion 203. The jacket is provided at its lower end with a re-entrant stem having a press seal through which extend relatively stiff lead-in wires 206 and 207. The wires 206 and 207 are connected at their outer ends to the electrical contacts of the usual screw type base 108 and at their inner ends to the arc tube 212 and the harness.

The arc tube 212 is generally made of quartz although other types of glass may be used such as alumina glass or Vycor, the latter being a glass of substantially pure silica. Sealed in the arc tube 212, at the opposite ends thereof, are the main discharge electrodes 213 and 214 supported on lead-in wires 204 and 205 respectively. Each of the main discharge electrodes 213 and 214 comprise a core portion, which may be a prolongation respectively of the lead-in wires 204 and 205, and may be prepared of a suitable metal such as molybdenum or tungsten wire helices if desired.

An auxiliary starting probe or electrode 118, generally prepared on tantalum or tungsten, may be provided at the base end of the arc tube 212 adjacent the main electrode 214 and may comprise the inwardly projecting end of another lead-in wire.

Each of the current lead-in wires described may have their ends welded to intermediate foil sections of molybdenum hermetically sealed within the pinched sealed portions of the arc tube 212. The foil sections may be very thin, for example approximately 0.0008 inch thick, and go into tension without rupturing or scaling off when the heated arc tube cools. Relatively short molybdenum wires 223, 224 and 235 may be welded to the outer ends of the foil and serve to convey current to the various electrodes inside the arc tube 212.

Metal strips 245 and 246 may be welded onto the lead-in wires 223 and 224 respectively. A resistor 226 may be electrically connected, e.g., welded, between the foil strips 245 and the arc tube harness. The resistor 226 may, for example, have a value of 40,000 ohms and serves to limit the current to the auxiliary electrode 218 during normal starting of the lamp. The foil strip 246 is electrically connected, e.g., welded, at one end to a piece of molybdenum foil sealed in the arc tube 212 which may in turn be welded to main electrodes 213 and 214. The metal foil strip 247 may be welded between the lead-in wire 235 and the harness. The pinched or flattened end portions of the arc tube 212 form a seal which can be of any desired width and can be made by flattening or compressing the ends of the arc tube 212 while they are heated.

A U-shaped internal wire supporting assembly or arc tube harness serves to maintain the position of the arc tube 212 substantially coaxially within the envelope 202. To support the arc tube 212 within the envelope, stiff lead-in wire 206 may be welded to the base 253 of the harness. Because the stiff lead-in wires 206 and 207 are connected to opposite sides of a power line they must be insulated from each other. Clamps 256 and 257 may be used to hold the arc tube 212 at the end portions and may be fixedly attached to the legs 254 of the harness. a rod 257 bridges the free ends of the U-shaped support wire 254 and may be fixedly attached thereto for imparting stability to the structure. The free ends of the U-shaped wire 254 may also be provided with a pair of metal springs 260 frictionally engaging the upper tubular portion of the lamp envelope 202. A heat shield 261 may be disposed beneath the arc tube 212 and above the resistor 226 to protect the resistor from any excessive heat generated during lamp operation.

The arc tube 212 is provided with a filling of mercury which reaches pressures in the order of one half to several atmospheres during normal lamp operation at temperatures of 450° to 700° C. In addition, metal halides are added to the arc tube to provide it with halogen atoms, iodine being preferred and except fluorine, the quantity being sufficient to form, for example, a ratio of 0.025 to 0.85 atom of halogen per atom of mercury. Generally, approximately $2.5 \times 10^{-5}$ to $8.0 \times 10^{-5}$ gram atoms of mercury are added per centimeter of arc length as measured as the distance as the distance between the electrodes.

The fabrication of the envelope, sealing techniques and positioning of the electrodes in the high pressure electric discharge device according to the present invention may take place in a manner quite similar to that known to the art with conventional mercury lamps. And further, the mercury may be added to the arc tube by techniques well known to the art. To prepare the arc tube, an envelope having a pair of electrodes disposed at either end thereof and spaced about 7 cm. from each other may be pumped down through an exhaust tabulation extending from the surface of the envelope and disposed in communication with the interior thereof. The envelope may then be baked and filled with argon to flush out residual impurities, as it is quite important to eliminate or substantially eliminate hydrogen and oxygen from the arc tube.

The electrodes may also be vacuum baked at 600° to 800° C for a few hours before their use to eliminate hydrogen which might be present. Furthermore, care should be exercised when sealing the the electrodes into the arc tube to prevent hydrogen containing combustion gases from seeping in or becoming absorbed by the surface.

EXAMPLE I

A reagent grade sodium iodide salt was ultra-purified and made into uniformly sized particles using the method and apparatus of the present invention as described above.

The salt initially contained hydroxide impurities in an amount of 150 parts per million, water in an amount of 5,000 parts per million, and had a total impurity content of about 5,250 parts per million. The salt had a particle size ranging from about 200 microns to 5 millimeters (mm), with about 50 weight percent of the particles in the range of about 1 mm to 2 mm.

Into the melt section of the vessel was placed 700 grams of the salt. The salt was then heated at about 110° C for 22 hours under a pressure of $10^{-3}$ Torr with evacuation or outgassing through conduits 16 and 20. In this manner about 90 percent of the water content of the salt was removed.

Following the outgassing, purified hydrogen gas having no readily measurable total impurity content was mixed with iodine vapor to form a gas mixture containing iodine in an amount of about 20 volume percent of the total gas mixture. This gas mixture was then passed over a platinum catalyst at 400° C to form a resulting gaseous mixture containing 40 volume percent hydrogen iodide and 60 volume percent by hydrogen, which mixture was then passed into conduit 20, through the salt 14 and out conduit 16 at a flow rate of 75 cc/min at an initial temperature of 110° C and pressure of about 760 mm Hg. While the hydrogen/hydrogen iodide gas mixture was still passing through the vessel, the temperature of the salt was over a 45 minute period raised above its m.p. of 652° C, to 665° C, and maintained at that point for 30 minutes.

Any dissolved gases were then removed by evacuating the atmosphere surrounding the molten salt to $10^{-2}$ mm Hg for 2 minutes. The evacuation was followed by a scrubbing procedure wherein pure inert gas was passed up through the molten salt at a flow rate of 75 cc/min for 2 minutes. This evacuation and scrubbing procedure was repeated 6 times with argon and then 3 times with helium to ensure removal of virtually 100 percent of the dissolved gases and water in the molten salt.

Following evacuation and scrubbing, the molten salt was filtered through a No. 3 porosity silica frit filter 100 and formed into precisely sized particles as follows. The condenser section 22 of the vessel was filled through conduit 20 with helium gas at 25° C to a pressure of 790 mm Hg. Additional helium at 660° C was then introduced into the vessel through conduit 16 at a pressure of 1030 mm Hg to force the molten salt through the filter and the nozzle, which was vibrated at a frequency of 4720 Hz using a conventional quartz rod 104 and a radio speaker 110, with a conventional variable oscillator and amplifier being used to drive the speaker. The molten salt came out of the nozzle in a continuous stream which then broke up into individual droplets. The droplets solidified during their fall in condenser section 22 and were collected as solid particles in collection vials 30.

The product particles had a particle size ranging from about 160 microns to 230 microns, with about 97 number percent of the particles in the range of about 220 microns to 230 microns.

These particles then contained about 2 parts per million total oxygen content, and a total impurity content of about 5 parts per million.

EXAMPLE II

Example I was repeated except for the following changes:

Instead of reacting hydrogen and iodine to form hydrogen halide to pass through the iodide salt, hydrogen gas saturated at room temperature (25° C) with iodine is passed through the vessel. The particles were made using helium at a pressure of about 790 mm Hg in the condenser, and helium at a pressure of 1030 mm Hg in the vessel above the molten salt. A frequency of vibration of 3650 Hz was used, with about 98 number percent of the product particles having a size of about 190 to 210 microns. The total oxygen content of these particles was less than 40 parts per million.

EXAMPLE III

A mixture of the purified sodium iodide of the same type produced by the previous examples, and pure scandium iodide was purified and made into particles of controlled size using the method and apparatus of the present invention as described above.

Into the melt section of the vessel was placed a mixture of 90 mole percent sodium iodide and 10 mole percent scandium iodide. The mixture was heated at about 110° C for 22 hours under a pressure of $10^{-3}$ Torr (mm Hg) with evacuation or outgassing through conduits 16 and 20.

Following the outgassing, purified hydrogen gas having no readily measurable total impurity content was mixed with iodine vapor to form a gas mixture containing iodine in an amount of about 20 volume percent of the total gas mixture. This gas mixture was then passed over a platinum catalyst at 400° C to form a resulting gaseous mixture containing 40 volume percent hydrogen iodide and 60 volume percent hydrogen, which mixture was then passed into conduit 20 through the salt 14 and out conduit 16 at a flow rate of 75 cc/min at an initial temperature of 110° C and pressure of about 760 mm Hg. While the hydrogen hydrogen-iodide gas mixture was still passing through the vessel, the temperature of the salt was over a 45 minute period raised above its m.p. of 648° C to 660° C and maintained at that point 30 minutes.

Any dissolved gases were then removed by evacuating the atmosphere surrounding the molten salt to $10^{-2}$ mm Hg for 2 minutes. The evacuation was followed by a scrubbing procedure wherein pure inert gas was passed up through the molten salt at a flow rate of 77 cc/min for 2 minutes. This evacuation and scrubbing procedure was repeated 6 times with argon and then 3 times with helium to ensure removal of virtually 100 percent of the dissolved gases and water in the molten salt. As discussed more fully below, the formation of tetraiodoscandate (III) in the melt allowed this evacuation procedure.

Following evacuation and scrubbing, the molten salt was filtered through a No. 3 porosity silica frit filter 100 and formed into precisely sized particles as follows. The condenser section 22 of the vessel was filled through conduit 20 with helium gas at 25° C to a pressure of 790 mm Hg. Additional helium at 660° C was then introduced into the vessel through conduit 16 at a pressure of 1030 mm Hg to force the molten salt through the filter and the nozzle which was vibrated at a frequency of 4720 Hz using a conventional quartz rod 104 and a radio speaker 110, with a conventional variable oscillator and amplifier being used to drive the speaker. The molten salt came out of the nozzle in a continuous stream which then broke up into individual droplets. The droplets solidified during their fall in condenser section 22 and were collected as solid particles in collection vials 30.

The product particles had a particle size ranging from about 160 microns to 280 microns, with about 97 number percent of the particles in the range of about 220 microns to 230 microns.

These particles then contained about 2 parts per million total oxygen content, and a total impurity content of about 5 parts per million.

Scandium triiodide, $ScI_3$, sometimes referred to more simply throughout the specification and claims as scandium iodide, does not melt, but sublimes at atmospheric pressure near 750° C. Unexpectedly, when scandium iodide is contacted at melt temperatures with sodium iodide in proportions of about 0.01 to 99.99 mole percent scandium iodide, and correspondingly from 99.99 to 0.01 mole percent sodium iodide, the coordinaton compound or entity sodium tetraiodoscandate (III), $Na^+ScI_4^-$ (III), has been found to be formed. This compound is stable to a temperature of approximately 825° C, above which scandium iodide fumes from the melt.

Figure 4:
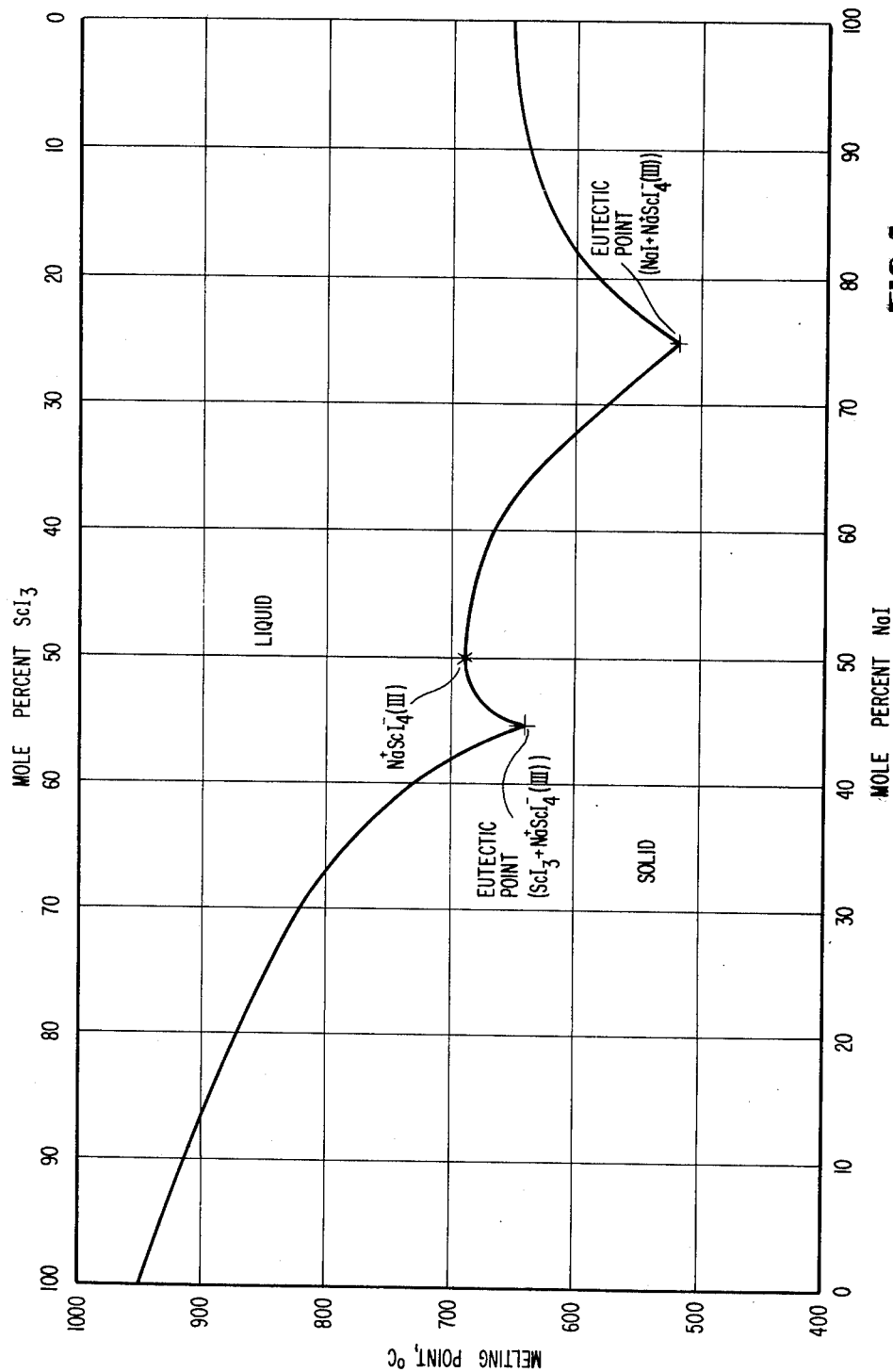
FIG. 4 is a phase diagram showing the eutectic points for mixtures of $Na^+ScI_4^-$(III) with $NaI$ and $ScI_3$.

A phase diagram of sodium tetraiodoscandate (III), sodium iodide, and scandium triiodide is shown in FIG. 4. Referring to the graph of FIG. 4, sodium tetraiodoscandate (III) have a eutectic point at 75 mole percent sodium iodide at about 530° C, and there is also a eutectic point between scandium triiodide and sodium tetraiodoscandate (III) at about 56 mole percent scandium triiodide at a temperature of about 650° C.

Molten scandium triiodide is known to have a yellow green color while molten sodium iodide is substantially transparent. Therefore, the mixture would be expected to be a shade corresponding to the relative concentration of these two constituents. However, it has been found that mixtures, for example, of from 0.01 to 55 mole percent scandium triiodide and correspondingly from 99.99 to 45 mole percent sodium iodide, when melted, have a blood red color. Further, this melt can be subjected to a temperature near 800° C without volatilizing scandium triiodide. These two properties, color and vapor pressure, in combination with the phase diagram, serve as excellent evidence of the new coordination entity, sodium tetraiodoscandate (III).

The phase diagram shown in FIG. 4 was constructed, using standard laboratory techniques, from melting points as a function of the composition. The data for the phase diagram was collected in two series of experiments. In the first series, scandium triiodide was added in known amounts to pure sodium iodide to give a series of points with a sodium iodide composition of 100, 91, 85, 74, 48, and 30 mole percent, and in the second series a composition of 55.5 mole percent scandium triiodide and 44.5 mole percent sodium iodide was started with, and sodium iodide was added to give points at 44.5, 50, 60, 71, 80 and 90 mole percent sodium iodide. The data was collected by melting the mixture in a quartz test tube under a protective atmosphere of argon. A thermocouple was inserted into the test tube to give the temperature. To find the melting point of the various mixtures, a standard laboratory procedure was used. That is, the mixture was heated until it was a clear melt, i.e., about 50° C above its melting point. the mixture was then allowed to cool and temperature was plotted as a function of time so that the cooling rate could be observed. As usual, at the melting point a break or sudden turn in the temperature/time plot is indicative of the melting point.

For a more detailed discussion of phase diagrams, refer to "Phase Diagrams for Ceramists", Levin, Robbins, and McMurdie, American Ceramics Society, 1964. For a more detailed discussion of coordination compounds or entities, refer to "Encyclopedia of Chemical Technology", Vol. 4, pages 379–384, Interscience Publishers, Inc., 1949.

EXAMPLE IV

About 20 milligrams of the sodium iodide-scandium iodide particles produced in Example III, along with 46 milligrams of mercury, 7.5 milligrams of mercuric iodide and 0.5 milligrams of thorium, are added to a lamp envelope having an arc length of approximately 4.5 centimeters. The envelope is then filled to a pressure of 760 mm Hg with argon gas which is then slowly vented out until a pressure of about 23 mm Hg is obtained. The envelope is then sealed. The resulting metal halide lamp of the type illustrated in FIG. 3 emits a desirable color blended light.

EXAMPLE V

A reagent grade mercury iodide salt was purified and made into particles of controlled size using the method and apparatus of the present invention as described above.

Into the melt section of the vessel was placed about 650 grams of the salt. The salt was then heated at about 110° C for 22 hours under a pressure of $10^{-3}$ Torr (mm Hg) with evacuation or outgassing through conduits 16 and 20. In this manner about 90 percent of the water content of the salt was removed.

Following the outgassing, purified hydrogen gas having no readily measurable total impurity content was mixed with iodine vapor to form a gas mixture containing iodine in an amount of about 20 volume percent of the total gas mixture. This gas mixture was then passed over a platinum catalyst at 400° C to form a resulting gaseous mixture containing 40 volume percent hydrogen iodide and 60 volume percent hydrogen, which mixture was then passed into conduit 20, through the salt 14 and out conduit 16 at a flow of 75 cc/min at an initial temperature of 110° C and pressure of about 760 mm Hg. While the hydrogen hydrogen-iodide mixture was still passing through the vessel, the temperature of the salt was raised over a 45 minute period about 10° C above its m.p. and maintained at that point 30 minutes.

Any dissolved gases were then removed by evacuating the atmosphere surrounding the molten salt to 200 mm Hg for 2 minutes. The evacuation was followed by a scrubbing procedure wherein inert gas was passed up through the molten salt at a flow rate of 75 cc/min for 2 minutes. This evacuation and scrubbing procedure was repeated 8 times with argon and 5 times with helium to ensure removal of virtually all of the dissolved gases and water in the molten salt.

Following evacuation and scrubbing, the molten salt was filtered through a No. 3 porosity silica frit filter 100 and formed into precisely sized particles as follows. The condenser section 22 of the vessel was filled through conduit 20 with helium gas at 25° C to a pressure of 1030 mm Hg. Additional helium at 275° C was then introduced into the vessel through conduit 16 at a pressure of 1195 mm Hg to force the molten salt through the filter and the nozzle was vibrated at a frequency of 3280 Hz using a conventional quartz rod 104 and a radio speaker 110, with a conventional variable oscillator and amplifier being used to drive the speaker. The molten salt came out of the nozzle in a continuous stream which then broke up into individual droplets. The droplets solidified during their fall in condenser section 22 and were collected as solid particles in collection vials 30.

The product particles had a particle size ranging from about 160 microns to 280 microns, with about 80 weight percent of the particles in the range of about 220 microns to 230 microns.

These particles then contained about 2 parts per million total oxygen content, and a total impurity content of about 5 parts per million.

All parts, percentages and ratios used throughout the specification and claims are by weight unless otherwise indicated.

The method for determining the total oxygen content of the halides is the technique of activation analysis which uses radioactive nuclei counts. See Analytical Chemistry, Vol. 36, Feb., 1964, page 2871; and Vol. 38, June 1966, page 947.

The Periodic Table referred to herein is the Mendeleev Periodic Table of the Elements appearing in Organic Chemistry, R. T. Morrison et al, Allyn and Bacon, Inc. Boston (1959).

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A high presure, light emitting, electric discharge device, which device comprises an arc tube having at least one electrode therein, a vaporizable fill disposed within said tube including a halide of a metal other than mercury introduced into the arc tube as solidified droplets of metal halide and having a total oxygen content of less than 50 parts per million.

2. The electric discharge device of claim 1 wherein said fill comprises sodium iodide and scandium iodide.

3. The electric discharge device of claim 1 wherein said fill comprises a metal halide having a total oxygen content of less than 20 parts per million.

4. The electric discharge device of claim 3 wherein said fill comprises sodium iodide and scandium iodide.

5. The electric discharge device of claim 1 wherein said fill comprises particles of a size in the range between about 100 and about 2,000 microns.

6. The electric discharge device of claim 5 wherein the halide is selected from the group consisting of the iodides, bromides and chlorides of the metals of the Lanthanide series, Groups 1a, 2a, 3a, 4a, 1b, 3b, mixtures thereof, and mixtures thereof including mercury.

7. The electric discharge device of claim 5 wherein the halide is selected from the group consisting of the iodides of the alkali metals, the Lanthanides, thallium, indium, scandium, mixtures thereof, and mixtures thereof including mercury.

8. the electric discharge device of claim 1 wherein the halide is selected from the group consisting of the iodides, bromides and chlorides of the metals of the Lanthanide series, Groups 1a, 2a, 3a, 4a, 1b, 3b, and mixtures thereof.

9. The electric discharge device of claim 1 wherein the halide is selected from the group consisting of the iodides of the alkali metals, the Lanthanides, thallium, indium, scandium, and mixtures thereof.

10. The electric discharge device of claim 9 wherein said fill comprises particles of a size in the range between about 100 and about 2,000 microns.

11. In a high pressure, light emitting, electric discharge device having an arc tube, at least one electrode therein and a vaporizable fill including a compound of two or more metals and at least one halogen disposed within the arc tube, the improvement wherein the compound is introduced into the arc tube as high purity metal halide particles of generally spheroid shape in the range between about 100 and about 2,000 microns and which have a total oxygen content of less than 50 parts per million.

12. In a high pressure electric discharge device having an arc tube, at least one electrode therein and a vaporizable fill including mercury, halogen and at least one metal selected from the group consisting of the alkali metals, the Lanthanides, and Groups 1a, 2a, 3a, 4a, 1b, 3b, disposed within the arc tube, the improvement wherein said vaporizable fill is introduced into the arc tube as high purity, free flowing metal halide particles of substantially uniform size and generally spheroid shape in the range between 100 and 2,000 microns and which have a total oxygen content of less than 20 parts per million.

13. In a high pressure electric discharge device having an arc tube, at least one elcetrode therein and, in operation, a vaporized fill including a compound of at least one halogen and at least two metals selected from the group consisting of the alkali metals, the Lanthanides, and Groups 1a, 2a, 3a, 4a, 1b, 3b, disposed within the arc tube, the improvement wherein said halogen and metals are introduced into the arc tube as a compound in the form of particles of the compound.

14. The improvement of claim 13 wherein the particles of the compound introudced into the arc tube have a total oxygen content of less than 50 parts per million.

15. The improvement of claim 13 wherein the compound introduced into the arc tube comprises from 0.01 to 55 mole percent scandium triiodide and correspondingly from 99.99 to 45 mole percent sodium iodide.

16. The improvement of claim 15 wherein the particles of the compound introduced into the arc tube have a total oxygen content of less than 20 parts per million.

* * * * *